United States Patent
Ewe et al.

(10) Patent No.: US 10,782,437 B2
(45) Date of Patent: Sep. 22, 2020

(54) RADIAL MAGNETIC DIPOLE DIELECTRIC TOOL

(71) Applicant: Halliburton Energy Services, Inc., Houston, TX (US)

(72) Inventors: Wei-Bin Ewe, Singapore (SG); Burkay Donderici, Pittsford, NY (US); Ahmed Elsayed Fouda, Houston, TX (US)

(73) Assignee: Halliburton Energy Servies, Inc., Houston, TX (US)

( * ) Notice: Subject to any disclaimer, the term of this patent is extended or adjusted under 35 U.S.C. 154(b) by 0 days.

(21) Appl. No.: 16/331,690

(22) PCT Filed: Oct. 16, 2017

(86) PCT No.: PCT/US2017/056735
§ 371 (c)(1),
(2) Date: Mar. 8, 2019

(87) PCT Pub. No.: WO2019/078811
PCT Pub. Date: Apr. 25, 2019

(65) Prior Publication Data
US 2020/0271817 A1      Aug. 27, 2020

(51) Int. Cl.
*G01V 3/28* (2006.01)
*E21B 17/10* (2006.01)
(Continued)

(52) U.S. Cl.
CPC ............ *G01V 3/28* (2013.01); *E21B 17/1021* (2013.01); *E21B 49/00* (2013.01); *G01V 3/30* (2013.01)

(58) Field of Classification Search
CPC ... G01V 3/18; G01V 1/52; G01V 3/34; G01V 3/38; G01V 5/04; E21B 47/00; E21B 4/02; E21B 7/062
(Continued)

(56) References Cited

U.S. PATENT DOCUMENTS

| 4,072,200 A | * | 2/1978 | Morris ................ E21B 47/0228 175/45 |
| 4,511,842 A | | 4/1985 | Moran et al. |

(Continued)

FOREIGN PATENT DOCUMENTS

| WO | 2013012349 | 1/2013 |
| WO | 2016072979 | 5/2016 |
| WO | 2016167771 | 10/2016 |

OTHER PUBLICATIONS

ISRWO International Search Report and Written Opinion for PCT/US2017/056735 dated Jul. 4, 2018.

*Primary Examiner* — Giovanni Astacio-Oquendo
(74) *Attorney, Agent, or Firm* — John Wustenberg; C. Tumey Law Group PLLC

(57) ABSTRACT

A dielectric tool, system, and method for determining properties of subterranean formations. A dielectric tool may comprise a tool body, a transmitter, a receiver, wherein the receiver is operable to measure formation dielectric response to the transmitter, and at least one of the transmitter or at least one of the receiver is operable to have a substantially radial magnetic dipole moment. A system may comprise a dielectric tool and an information handling system, wherein the information handling system is operable to determine properties of a subterranean formation based at least on the measured formation dielectric response. A method for determining properties of a subterranean formation may comprise placing a dielectric tool in a wellbore, operating the dielectric tool in the wellbore, measuring a formation dielectric response using the dielectric tool, producing a modeled formation dielectric response, and determining the properties of the subterranean formation from the modeled formation dielectric response.

20 Claims, 8 Drawing Sheets

(51) Int. Cl.
*E21B 49/00* (2006.01)
*G01V 3/30* (2006.01)

(58) Field of Classification Search
USPC ............. 324/346, 341, 333, 334, 338, 339
See application file for complete search history.

(56) References Cited

U.S. PATENT DOCUMENTS

| | | |
|---|---|---|
| 4,594,552 A | 6/1986 | Grimaldi et al. |
| 4,652,828 A | 3/1987 | Kenyon et al. |
| 4,933,640 A * | 6/1990 | Kuckes .................... G01V 3/28 |
| | | 324/339 |
| 5,230,386 A | 7/1993 | Wu et al. |
| 6,178,818 B1 * | 1/2001 | Plochinger ........... G01D 5/2405 |
| | | 361/284 |
| 6,591,195 B2 | 7/2003 | Haugland |
| 6,690,170 B2 | 2/2004 | Homan et al. |
| 7,242,194 B2 | 7/2007 | Hayman et al. |
| 7,363,160 B2 | 4/2008 | Seleznev et al. |
| 7,809,508 B2 | 10/2010 | Desport |
| 8,957,683 B2 | 2/2015 | Bittar et al. |
| 2002/0062992 A1 * | 5/2002 | Fredericks ............... G01V 1/52 |
| | | 175/40 |
| 2006/0253255 A1 | 11/2006 | Omeragic et al. |
| 2010/0321325 A1 | 12/2010 | Springer et al. |
| 2011/0221443 A1 | 9/2011 | Bittar et al. |
| 2013/0006535 A1 | 1/2013 | Zhang et al. |
| 2014/0152332 A1 * | 6/2014 | Platte ..................... G01N 27/07 |
| | | 324/713 |
| 2016/0003963 A1 | 1/2016 | Kouchmeshky et al. |
| 2016/0156319 A1 * | 6/2016 | Barbieri .............. H03F 3/45708 |
| | | 381/111 |
| 2016/0230548 A1 | 8/2016 | Gzara et al. |
| 2016/0291195 A1 | 10/2016 | Wu et al. |

\* cited by examiner

RADIAL MAGNETIC DIPOLE DIELECTRIC TOOL

BACKGROUND

Wellbores drilled into subterranean formations may enable recovery of desirable fluids (e.g., hydrocarbons) using a number of different techniques. Knowing formation properties may help in locating and recovering desirable fluids. Dielectric tools may be utilized to determine formation properties. Dielectric tools may operate by transmitting an electric field and recording the change in the electric field. Ideally, dielectric tools may be disposed adjacent to a wall of a wellbore within a formation to determine properties of the formation. However, a standoff, or distance between the dielectric tool and the wall of the wellbore may exist. In water based mud, the standoff may have little effect on the transmission and analysis of the electric field. In oil based mud, the standoff may have an adverse effect on the transmission and analysis of the electric field. It may be beneficial to have a dielectric tool that may be configured to operate in both oil based mud and water based mud efficiently.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to a dielectric tool and methods of determining formation properties. More specifically, it may describe systems and methods that include radial magnetic dipole transmitters and receivers disposed in a pad, which may be disposed on a dielectric tool. The dielectric tool and pads may be disposed in oil based or water based mud.

A dielectric tool may be employed in subterranean operations to determine formation properties in wellbores. A dielectric tool may utilize radial magnetic dipole transmitters and receivers to determine formation properties.

Systems and methods of the present disclosure may be implemented, at least in part, with an information handling system. An information handling system may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
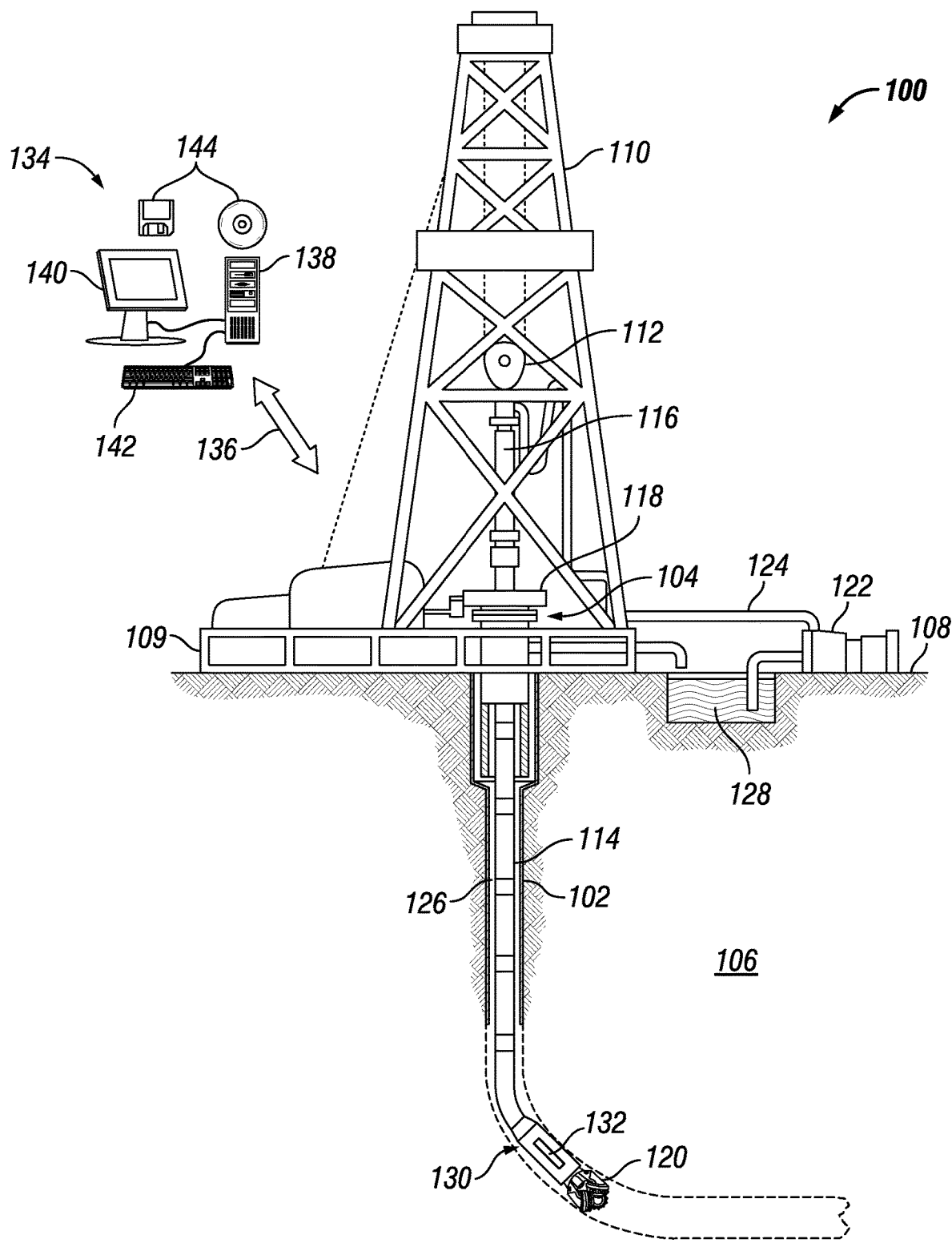
FIG. 1 is an illustration of an example of a drilling system including a dielectric tool in a wellbore.

FIG. 1 illustrates a drilling system 100. As illustrated, wellbore 102 may extend from a wellhead 104 into a subterranean formation 106 from a surface 108. Generally, wellbore 102 may include horizontal, vertical, slanted, curved, and other types of wellbore geometries and orientations. Wellbore 102 may be cased or uncased. In examples, wellbore 102 and may include a metallic material. By way of example, the metallic member may be a casing, liner, tubing, or other elongated steel tubular disposed in wellbore 102.

As illustrated, wellbore 102 may extend through subterranean formation 106. As illustrated in FIG. 1, wellbore 102 may extending generally vertically into the subterranean formation 106, however wellbore 102 may extend at an angle through subterranean formation 106, such as horizontal and slanted wellbores. For example, although FIG. 1 illustrates a vertical or low inclination angle well, high inclination angle or horizontal placement of the well and equipment may be possible. It should further be noted that while FIG. 1 generally depicts a land-based operation, those skilled in the art may recognize that the principles described herein are equally applicable to subsea operations that employ floating or sea-based platforms and rigs, without departing from the scope of the disclosure.

As illustrated, a drilling platform 109 may support a derrick 110 having a traveling block 112 for raising and lowering drill string 114. Drill string 114 may include, but is not limited to, drill pipe and coiled tubing, as generally known to those skilled in the art. A kelly 116 may support drill string 114 as it may be lowered through a rotary table 118. A drill bit 120 may be attached to the distal end of drill string 114 and may be driven either by a downhole motor and/or via rotation of drill string 114 from surface 108. Without limitation, drill bit 120 may include, roller cone bits, PDC bits, natural diamond bits, any hole openers, reamers, coring bits, and the like. As drill bit 120 rotates, it may create and extend wellbore 102 that penetrates various subterranean formations 106. A pump 122 may circulate drilling fluid through a feed pipe 124 to kelly 116, downhole through interior of drill string 114, through orifices in drill bit 120, back to surface 108 via annulus 126 surrounding drill string 114, and into a retention pit 128.

With continued reference to FIG. 1, drill string 114 may begin at wellhead 104 and may traverse wellbore 102. Drill bit 120 may be attached to a distal end of drill string 114 and may be driven, for example, either by a downhole motor and/or via rotation of drill string 114 from surface 108. Drill bit 120 may be a part of bottom hole assembly 130 at distal end of drill string 114. Bottom hole assembly 130 may further include a dielectric tool 132, wherein dielectric tool 132 comprises a tool body. As will be appreciated by those of ordinary skill in the art, bottom hole assembly 130 may be a measurement-while drilling (MWD) or logging-while-drilling (LWD) system.

Without limitation, bottom hole assembly 130 may be connected to and/or controlled by information handling system 134, which may be disposed on surface 108. Without limitation, information handling system 134 may be disposed down hole in bottom hole assembly 130. Processing of information recorded may occur down hole and/or on surface 108. Processing occurring downhole may be transmitted to surface 108 to be recorded, observed, and/or further analyzed. Additionally, information recorded on information handling system 134 that may be disposed down hole may be stored until bottom hole assembly 130 may be brought to surface 108. In examples, information handling system 134 may communicate with bottom hole assembly 130 through a communication line (not illustrated) disposed in (or on) drill string 114. In examples, wireless communication may be used to transmit information back and forth between information handling system 134 and bottom hole assembly 130. Information handling system 134 may transmit information to bottom hole assembly 130 and may receive as well as process information recorded by bottom hole assembly 130. In examples, a downhole information handling system (not illustrated) may include, without limitation, a microprocessor or other suitable circuitry, for estimating, receiving and processing signals from bottom hole assembly 130. Downhole information handling system (not illustrated) may further include additional components, such as memory, input/output devices, interfaces, and the like. In examples, while not illustrated, bottom hole assembly 130 may include one or more additional components, such as analog-to-digital converter, filter and amplifier, among others, that may be used to process the measurements of bottom hole assembly 130 before they may be transmitted to surface 108. Alternatively, raw measurements from bottom hole assembly 130 may be transmitted to surface 108.

Any suitable technique may be used for transmitting signals from bottom hole assembly 130 to surface 108, including, but not limited to, wired pipe telemetry, mud-pulse telemetry, acoustic telemetry, and electromagnetic telemetry. While not illustrated, bottom hole assembly 130 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 134 via a communication link 136, which may be a wired or wireless link. The telemetry data may be analyzed and processed by information handling system 134.

As illustrated, communication link 136 (which may be wired or wireless, for example) may be provided that may transmit data from bottom hole assembly 130 to an information handling system 134 at surface 108. Information handling system 134 may include a processing unit 138, a monitor 140, an input device 142 (e.g., keyboard, mouse, etc.), and/or computer media 144 (e.g., optical disks, magnetic disks) that can store code representative of the methods described herein. In addition to, or in place of processing at surface 108, processing may occur downhole.

Figure 2:
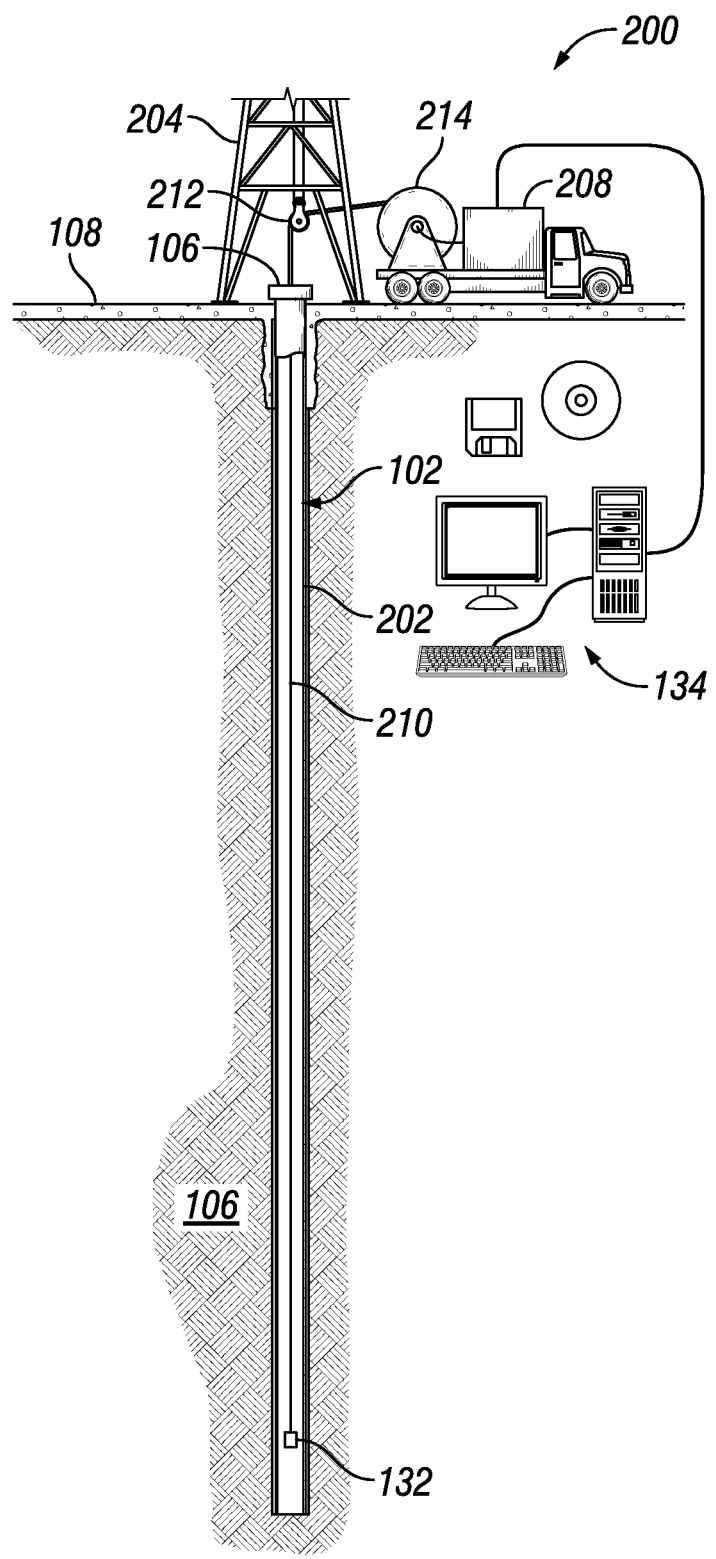
FIG. 2 is an illustration of an example conveyance line system including a dielectric tool in a wellbore.

FIG. 2 illustrates a dielectric tool system 200. As illustrated, wellbore 102 may extend from wellhead 104 into subterranean formation 106 from a surface 108. Generally, wellbore 102 may include horizontal, vertical, slanted, curved, and other types of wellbore geometries and orentations. Wellbore 102 may include a metallic member 202. Metallic member 202 may be disposed within wellbore 102 and may include a metallic material that may be conductive and magnetic. By way of example, metallic member 202 may be a casing, liner, tubing, or other elongated steel tubular disposed in wellbore 102. Properties of subterranean formation 106 may be determined by dielectric tool system 200 from within wellbore 102.

Dielectric tool system 200 may be supported by derrick 204 at surface 108. Dielectric tool 132 may be tethered to vehicle 208 through conveyance line 210. Conveyance line 210 may be disposed around one or more sheave wheels 212. Derrick 204 may include a load cell (not shown) which determines the amount of pull on conveyance line 210 at surface 108. Information handling system 134 may control a safety valve (not illustrated) which controls the hydraulic pressure that drives drum 214 on vehicle 208, which may reel up and/or release conveyance line 210 which may move dielectric tool 132 up and/or down. The safety valve may be adjusted to a pressure such that sheave wheel 212 may only impart a small amount of tension to conveyance line 210 and/or over and above the tension necessary to retrieve conveyance line 210 and/or dielectric tool 132. The safety valve is typically set a few hundred pounds above the amount of desired safe pull on conveyance line 210 such that once that limit is exceeded, further pull on conveyance line 210 may be prevented.

Conveyance line 210 may individually be a wireline, slickline, coiled tubing, pipe, or the like, which may provide mechanical suspension as well as electrical conductivity for dielectric tool 132. Where it may provide electrical conducting, conveyance line 210 may include an inner core of a plurality of electrical conductors covered by an insulating wrap. An inner and outer steel armor sheath may be disposed around the conductors. The electrical conductors may be used for communicating power and telemetry between vehicle 208 (or other equipment) and dielectric tool 132.

Figure 3:
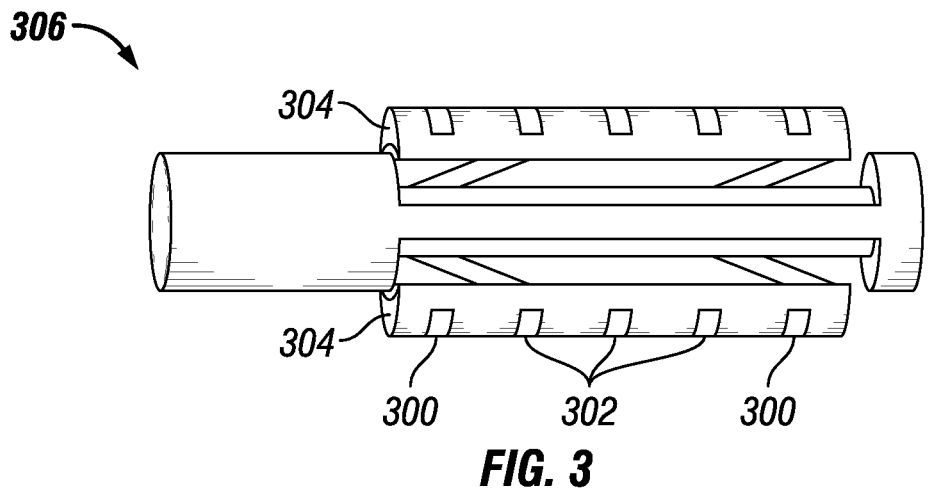
FIG. 3 is a schematic illustration of a dielectric tool for a conveyance line.
Figure 4:
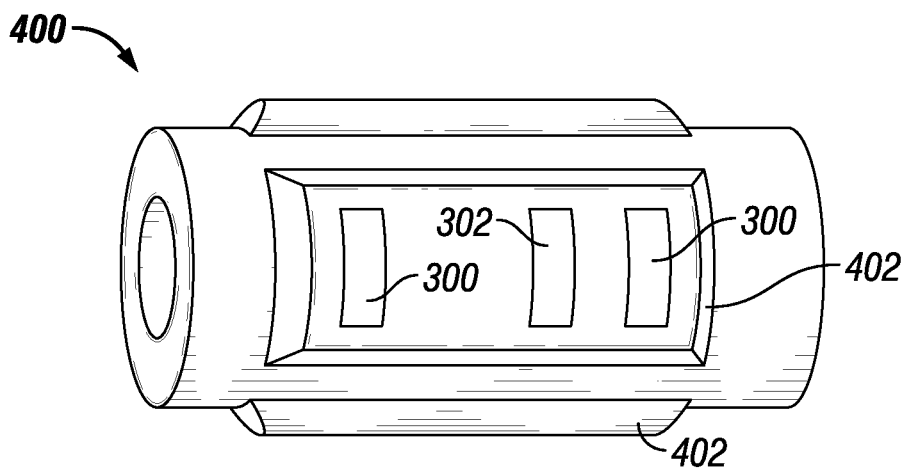
FIG. 4 is a schematic illustration of a logging while drilling dielectric tool for a drilling system.
Figure 5:
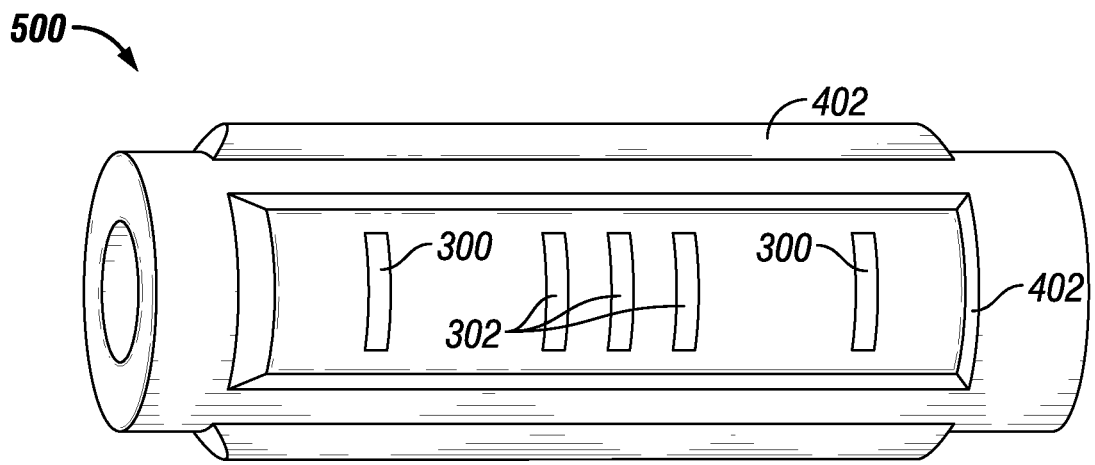
FIG. 5 is a schematic illustration of an alternative logging while drilling dielectric tool for a drilling system.

Dielectric tool 132 as illustrated in FIGS. 3-5 may include a transmitter 300 and/or may include a receiver 302. Transmitter 300 and/or receiver 302 may transmit and sense, respectively, a frequency between about 0.5 Ghz and about 2 Ghz. It should be noted that dielectric tool 132 may include a plurality of transmitters 300 or a plurality of receivers 302. Transmitter 300 and receiver 302 may work together to determine the properties of subterranean formation 106 from wellbore 102. Transmitters 300 and receivers 302 may be disposed along a longitudinal axis of dielectric tool 132 in arm 304. Transmitter 300 may be an electromagnetic type transmitter which may include a dielectric material, discussed below, capable of producing and broadcasting an electromagnetic field. Receiver 302 may be able to record the broadcasted electromagnetic field from transmitter 300. Additionally, a combination of multiple transmitter 300 and/or receivers 302 may be used to generate an antenna that may effectively be directed at the desired direction. It should be noted that the antenna may be a transmitter 300 and/or a receiver 302. Transmitter 300 and receiver 302 may be operated in real-time, including downhole processing for properties of subterranean formation 106. Information handling system 140 of dielectric tool system 200 may operate transmitter 300 and receiver 302 on dielectric tool 132.

FIG. 3 illustrates dielectric tool 132 (Referring to FIG. 1) that may be operable as a wireline dielectric logging tool 306. Wireline dielectric logging tool 306 may include arm 304 that may extend from wireline dielectric logging tool 306 to contact a wall of wellbore 102. It should be noted that there may be a plurality of arms 304. One or more arms 304 may place an arrangement of transmitters 300 and receiver 302 in close proximity to the wall of wellbore 102. Arm 304 illustrated in FIG. 3 may include a pair of axially-spaced transmitters 300 and receivers 302, which may be axially spaced between transmitters 300. In examples, transmitters 300 and/or receivers 302 may be embedded in wireline dielectric logging tool 306. Arm 304 may extend from the opposite side of wireline dielectric logging tool 306 to hold transmitter 300 and receiver 302 in close proximity to the wall of wellbore 102.

FIG. 4 illustrates dielectric tool 132 that may be configured as LWD dielectric logging tool 400. LWD dielectric logging tool 400 may include two or more stabilizers 402 that maintain LWD dielectric logging tool 400 near the center of wellbore 102 and, in so doing, minimize the standoff between the wall-contacting surfaces of stabilizers 402 and the wall of wellbore 102. It may be desirable to minimize the thickness of a fluid layer (not illustrated) between transmitter 300 and/or receiver 302 and the wall of wellbore 102. Other mechanism may be employed to minimize standoff in the LWD dielectric logging tool 400, including extendable arms (not illustrated) or biasing springs (not illustrated). Alternatively, such arms or springs may be used to force LWD dielectric logging tool 400 against the wall of wellbore 102. Stabilizers 402 may include transmitters 300 and/or receivers 302, which may be spaced at different distances from each other. Stabilizers 402 may disposed transmitters 300 and receiver 302 adjacent the wall of wellbore 102 to reduce standoff.

FIG. 5 illustrates a side-view of an alternative LWD dielectric tool 500 of dielectric tool 132. One or more of the stool's stabilizers 402 may include two transmitters 300 and three axially-spaced receivers 302 positioned between transmitters 302. Some embodiments include one or more additional pairs of transmitters 300 at different distances from the group of receivers 302.

As LWD dielectric tools 400 and 500 rotate and progresses downhole at the drilling rate, each sensing surface will trace a helical path on the wall of wellbore 102. Orientation sensors (not illustrated) within LWD dielectric tools 400 and 500 may be used to associate the measurements with the sensors' positions on the wall of wellbore 102. Electronics within LWD dielectric tools 400 and 500 may aggregate measurements versus position to form a detailed map of properties of subterranean formation 106, which may be stored for later retrieval or compressed and transmitted to surface 108. Information handling system 134 may collect subterranean formation 106 measurements, orientation (azimuth) measurements, and tool position measurements, and process the collected measurements to create and display the map.

In each dielectric tool 132, transmitter 300 and receiver 302 may generate radial magnetic dipole moments. A radial magnetic dipole moment may include emitting and/or receiving a magnetic field in a substantially radial direction, which the radial direction is one that is perpendicular to the radial axis of dielectric tool 132. Here, substantially radial may mean within about 5 degrees of the perpendicular to the axis of dielectric tool 132, or within about 15 degrees of the perpendicular to the axis of dielectric tool 132, or within about 30 degrees of the perpendicular to the axis of dielectric tool 132. In embodiment of FIGS. 3-5, each transmitter 300 may induce magnetic fields in a substantially radial direction. It should be noted that transmitter 300 and receiver 302 may include a dielectric resonator antenna, which may be transmitter 300 and/or receiver 302. In examples, transmitter 300 and receiver 302 may further include a substantially radially oriented loop. FIGS. 6-10 illustrate different examples of transmitter 300 and receiver 302.

Figure 6:
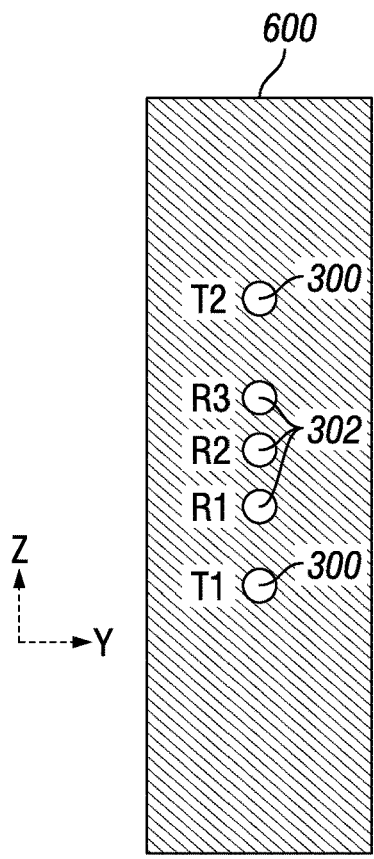
FIG. 6 is a schematic illustration of a transmitter and a receiver disposed on a dielectric tool.
Figure 7:
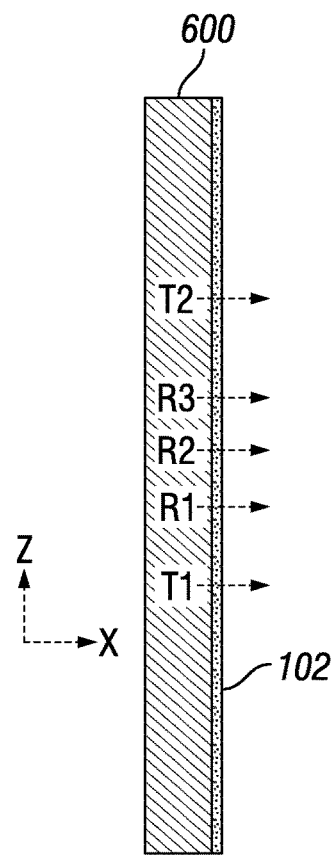
FIG. 7 is a schematic illustration of a transmitter and a receiver disposed on a dielectric tool and the standoff between the dielectric tool and the wall of a wellbore.
Figure 8:
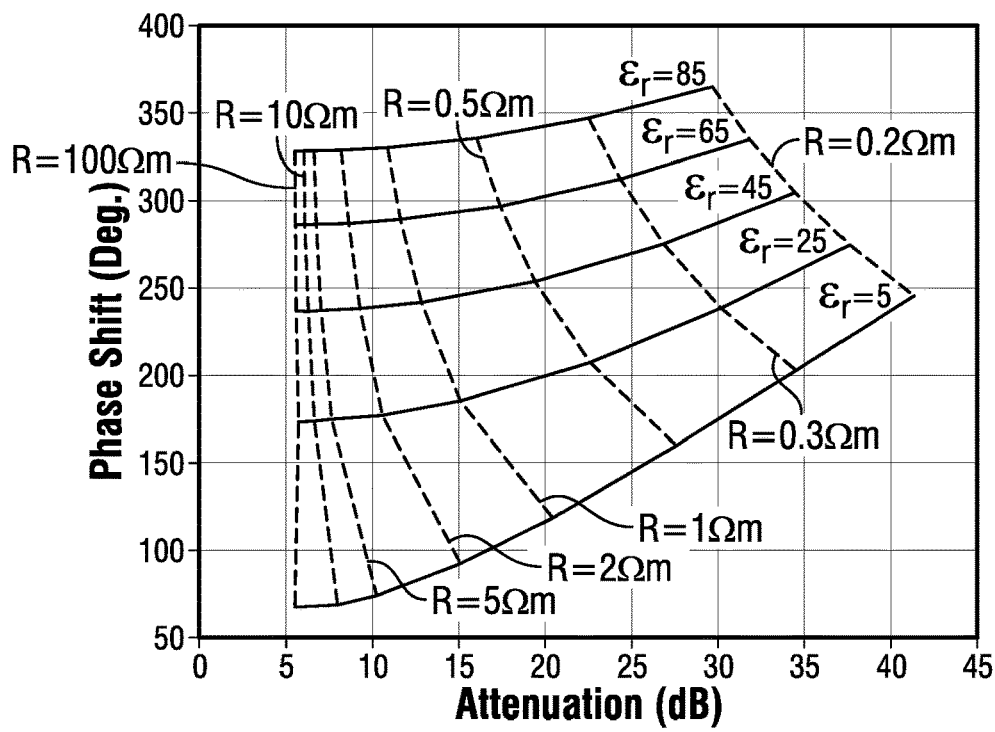
FIG. 8 illustrates a graph of an ideal attenuation-phase shift plot with no standoff between the dielectric tool and the wall of the wellbore.
Figure 9:
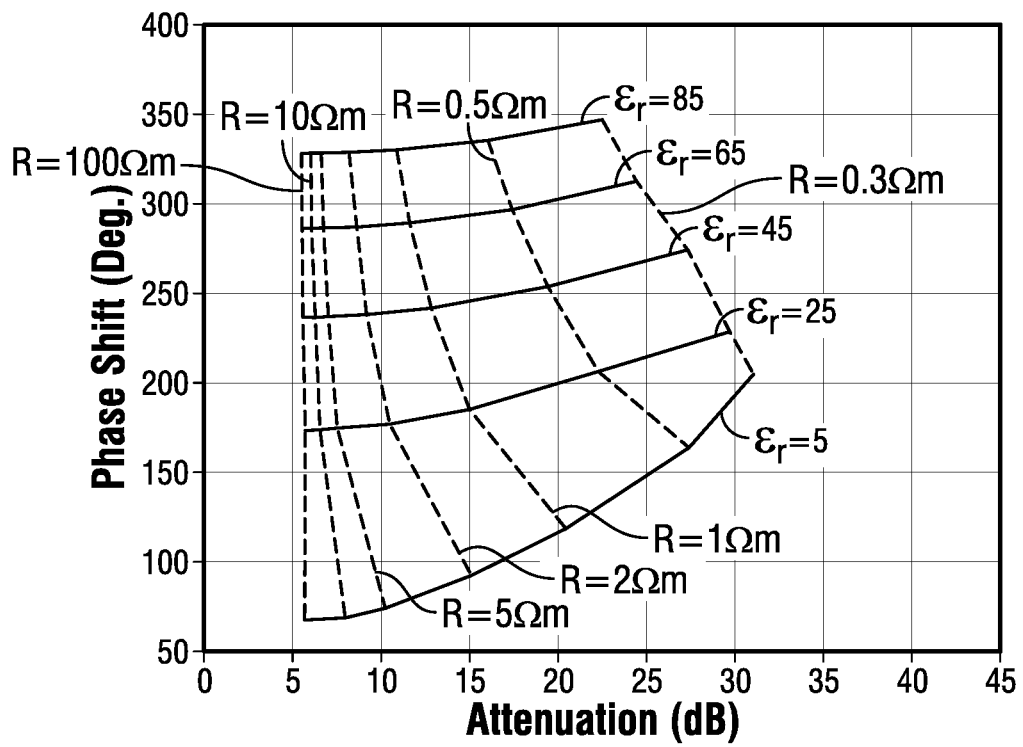
FIG. 9 illustrates a graph of an attenuation-phase shift plot with a standoff in oil based mud.
Figure 10:
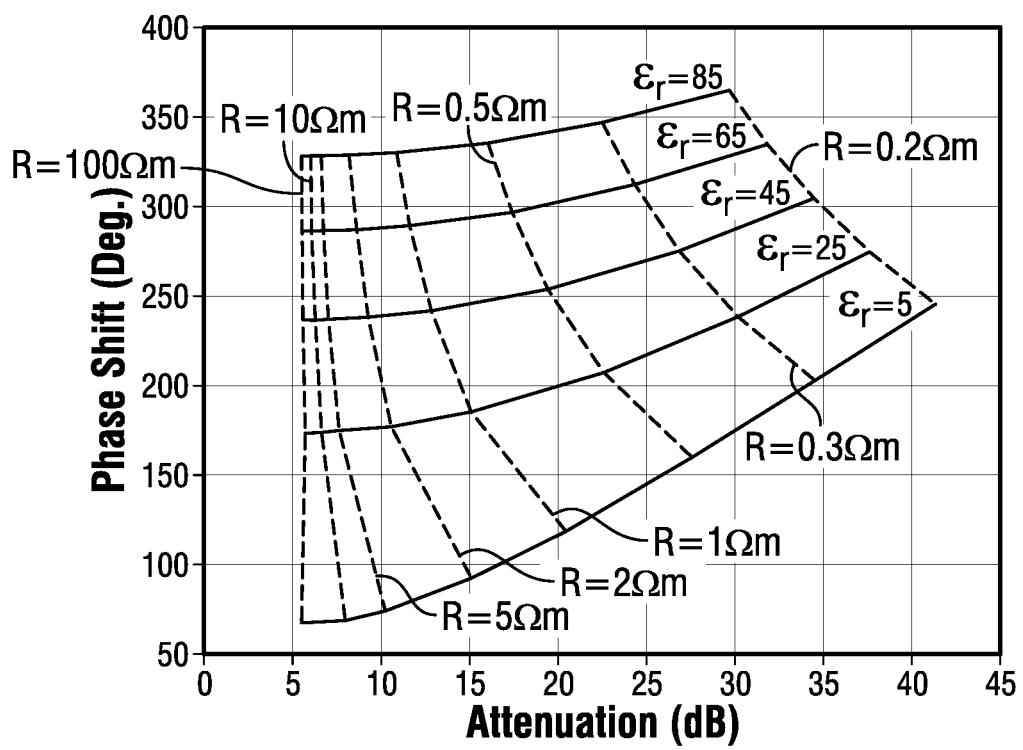
FIG. 10 illustrates a graph of an attenuation-phase shift plot with a standoff in water based mud.

FIG. 6 illustrates a schematic layout of pad 600, which may be disposed on dielectric tool 132 (Referring to FIG. 2). Dielectric tool 132 may include at least two receivers 302 and at least one transmitter 300. Receiver 302 and transmitter 300 may produce radial magnetic dipoles. FIG. 7 illustrates a side view of pads 600 adjacent the wall of wellbore 102. Pads 600 may include transmitters 300 and/or receivers 302. While pad 600 may contact the wall of wellbore 102, there may be a slight standoff between pad 600 and the wall of wellbore 102 in which water based mud or oil based mud may reside. FIG. 8 illustrates phase shift in relation to attenuation if pad 600 (Referring to FIG. 6) is in direct contact with the wall of wellbore 102 (Referring to FIG. 1). FIG. 9 illustrates phase shift in relation to attenuation if pad 600 is 0.05 inches from the wall of wellbore 102 in oil based mud. FIG. 10 illustrates phase shift in relation to attenuation if pad 600 is 0.05 inches from the wall of wellbore 102 in water based mud. It may be observed from FIGS. 8-10 the dielectric constant identified as [Er] for dielectric tool 132 (referring to Figure) and formation resistivity identified as [R]. The graphs in FIGS. 8-10 illustrate radial magnetic dipole moments within transmitter 300 and receiver 302 increase the ability for an operator to determine [Er] and [R], whereas tangential dipole moments within transmitter 300 and receiver 302 decrease the ability for an operator to determine [Er] and [R], specifically in oil based mud.

Figure 11:
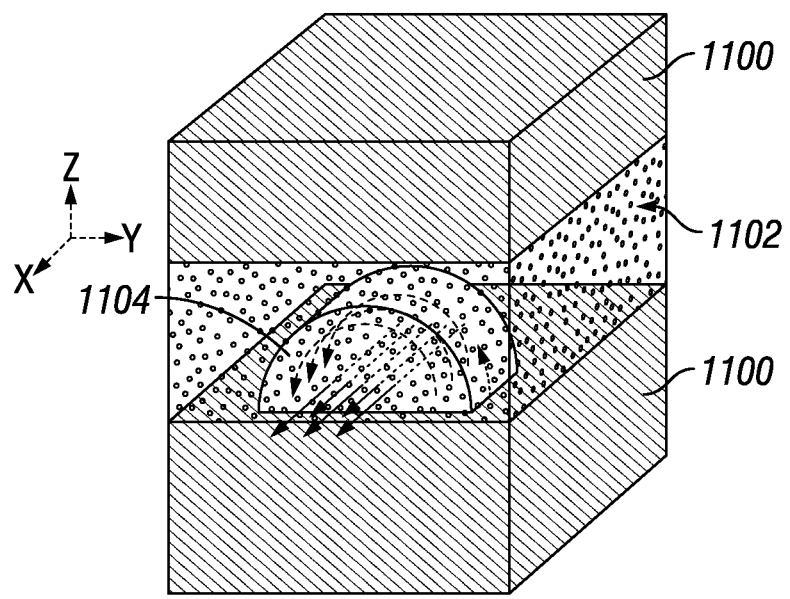
FIG. 11 is a schematic illustration of an example of a dielectric material disposed in a pad.
Figure 12:
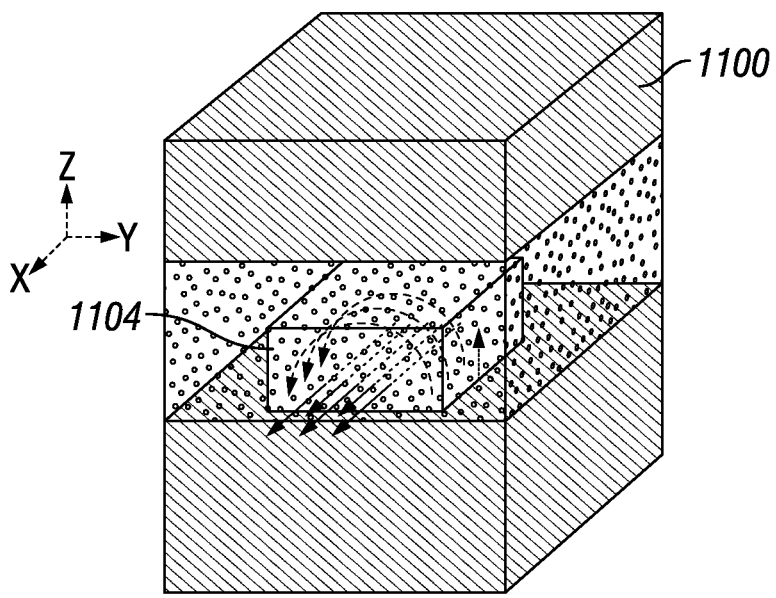
FIG. 12 is a schematic illustration of an alternative example of a dielectric material disposed in a pad.

Transmitter 300 and receiver 302 may include different compositions as illustrated in FIGS. 11-15. FIG. 11 illustrates an example of transmitter 300 and receiver 302 which may include pad 1100, an insulator 1102, and dielectric material 1104. Dielectric material 1104 may include a half circle, which may magnetically, be a full circle with the help of pad 1100. Pad 1100 may allow current from dielectric material 1104 to travel through pad 1100 in the same manner as dielectric material 1104. As illustrated in FIG. 11, the rotation of current through dielectric material 1104 may produce a radial magnetic dipole moment. Dielectric material 1104 may include additional configurations to form a radial magnetic dipole moment. For example, in FIG. 12 dielectric material may include a half square, which may magnetically, be a complete with the help of pad 1100. Current may flow in a radial direction through dielectric material 1104, which may produce a radial magnetic dipole moment.

Figure 13:
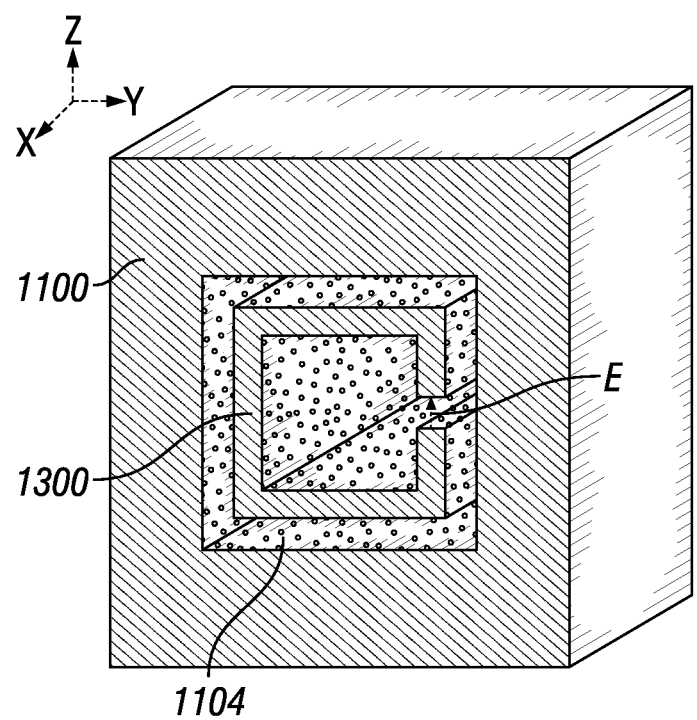
FIG. 13 is a schematic illustration of an alternative example of a dielectric material disposed in a pad.
Figure 14:
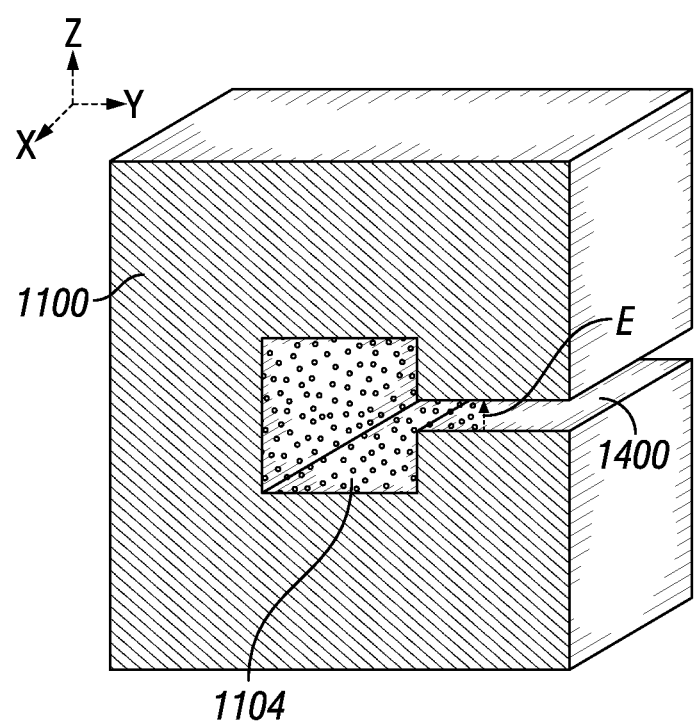
FIG. 14 is a schematic illustration of an alternative example of a dielectric material disposed in a pad.
Figure 15:
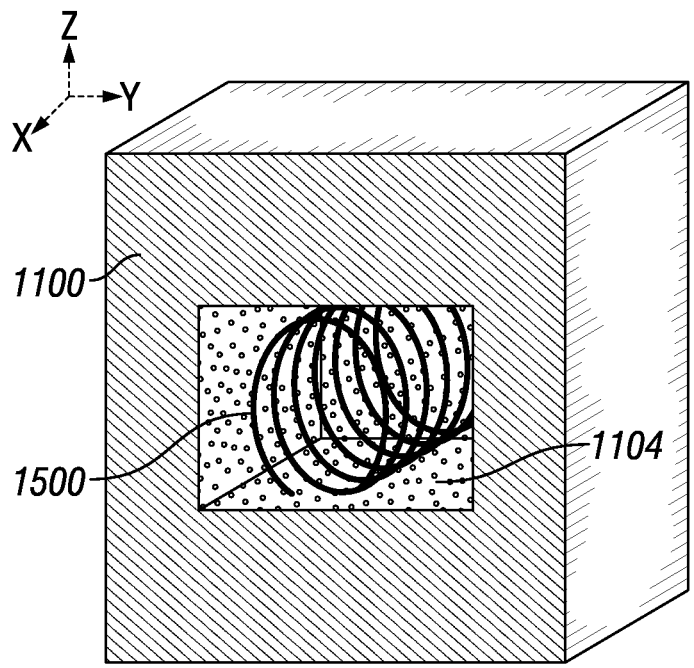
FIG. 15 is a schematic illustration of an alternative example of a dielectric material disposed in a pad.

FIG. 13 illustrates transmitter 300 and receiver 302 which may include a C-channel conductor 1300 that may be embedded in dielectric material 1104, which may be further embedded in pad 1100. In FIG. 14, dielectric material 1104 may form a square which may be embedded in pad 1100. It should be noted that in this configuration, dielectric material 1104 may further include a bridge 1400, which may allow a current to pass to dielectric material 1104. In examples, as illustrated in FIG. 15, dielectric material 1104, which may be disposed in pad 1100, may include a coil 1500. It should be noted, that in this example, dielectric material 1104 may not include bridge 1400 (referring to FIG. 14). Current may flow through coil 1500 in a radial direction, which may produce a radial magnetic dipole moment. FIGS. 11-15 illustrate different configurations, without limitation, that may operate to direct current in a radial direction, which may produce a radial magnetic dipole moment. Producing a radial magnetic dipole moment may be utilized to determine properties within formation 106 (referring to FIG. 1).

Figure 16:
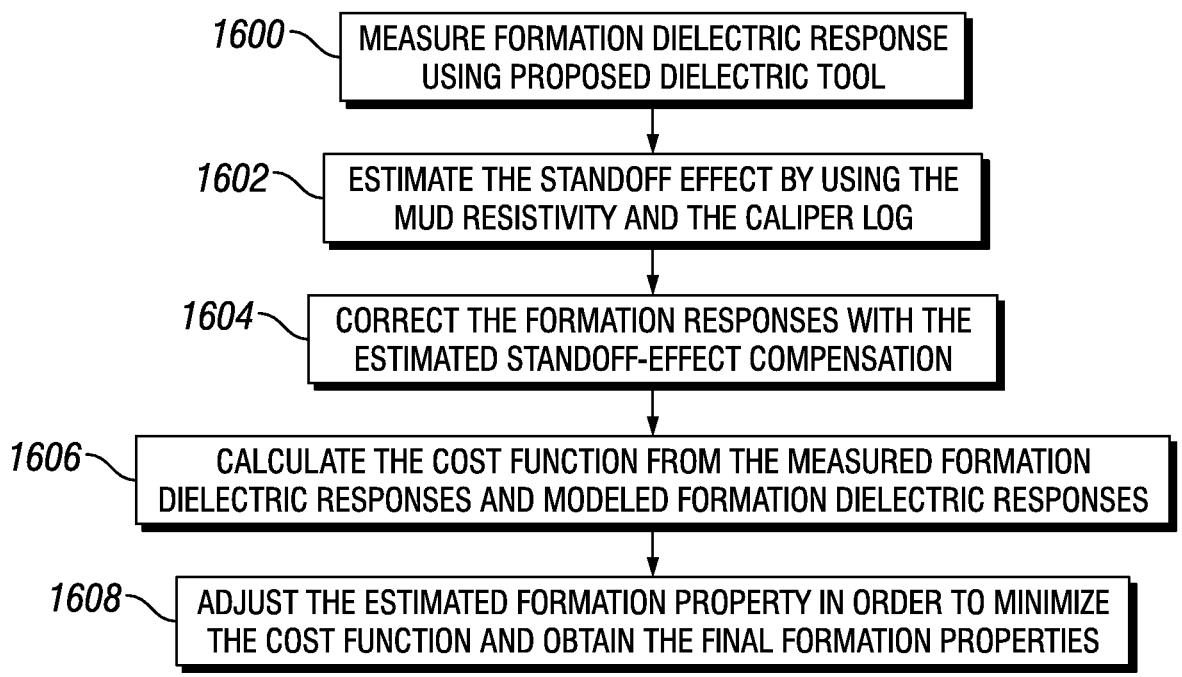
FIG. 16 illustrates a workflow of determining formation properties with a dielectric tool.

FIG. 16 illustrates a workflow for using dielectric tool 132 (referring to FIG. 2) with radial magnetic dipole moments. The workflow may be utilized to estimate the standoff effect. The standoff effect may be described as the space between pad 600 (referring to FIG. 6) and formation 106 (referring to FIG. 1). In step 1600, formation 106 dielectric response may be measured using dielectric tool 132 (Referring to FIG. 2). From measurements in step 1600, step 1602 may estimate the standoff effect, which may be determined by using the mud resistivity and the caliper log. The estimate of the standoff effect in step 1602 may allow step 1604 to correct the formation responses with the estimated standoff effect compensation. The corrected formation response in step 1604 may be utilized in step 1606 to calculate the cost function from the measured formation dielectric responses and modeled formation dielectric responses. The calculated cost function in step 1606 may further be utilized in step 1608 to adjust the estimated formation property in order to minimize the cost function and obtain the final formation properties.

This disclosure may include any of the various features of the compositions, methods, and systems disclosed herein, including one or more of the following features in any combination.

Statement 1: A dielectric tool comprising: a tool body; a transmitter coupled to the tool body and operable to generate a frequency between about 0.5 GHz and about 2 GHz; a receiver coupled to the tool body, wherein the receiver is operable to measure formation dielectric response to the transmitter; and at least one of the transmitter or at least one of the receiver is operable to have a substantially radial magnetic dipole moment.

Statement 2: The dielectric tool of statement 1, wherein the dielectric tool further comprises a pad coupled to the tool body, wherein the at least one of the transmitter and/or the receiver is disposed on pad, wherein the pad is disposed adjacent a wall of a wellbore.

Statement 3: The dielectric tool of statement 1 or statement 2, wherein the dielectric tool comprises stabilizers that extend from the tool body, wherein the at least one of the transmitter and the at least one of the receiver is disposed on at least one of the stabilizers and the stabilizers are disposed adjacent a wall of a wellbore.

Statement 4: The dielectric tool of any preceding statement, wherein the dielectric tool is disposed in a wellbore on a conveyance.

Statement 5: The dielectric tool of any preceding statement, wherein the dielectric tool comprises at least one arm coupled to the tool body, wherein the at least one arm extends away from the tool body.

Statement 6: The dielectric tool of any preceding statement, wherein the at least one of the transmitter or at least two receivers is a dielectric resonator antenna.

Statement 7: The dielectric tool of any preceding statement, wherein the at least one of the transmitter or the at least one of the receiver is a substantially radially oriented loop.

Statement 8: The dielectric tool of any preceding statement, wherein the transmitter or the receiver has a magnetic dipole that is between about 0 degrees and about 30 degrees from a radial axis.

Statement 9: The dielectric tool of any preceding statement, wherein the dielectric tool comprises a pad coupled to the tool body and a dielectric material disposed in the pad, and wherein the at least one of the transmitter and the at least one of the receiver comprises a coil that is disposed in the dielectric material.

Statement 10: The dielectric tool of any preceding statement, wherein the dielectric tool comprises a pad coupled to the tool body and a dielectric material disposed in the pad, and wherein the at least one of the transmitter and the at least one of the receiver comprises a conductor in a form of a C-channel disposed in the dielectric material.

Statement 11: The dielectric tool of any preceding statement, wherein the dielectric tool comprises a pad coupled to the tool body and an insulator disposed in the pad, wherein the at least one of the transmitter and the at least one of the receiver comprises a dielectric material disposed in the insulator.

Statement 12: A system comprising: a dielectric tool comprising: a tool body; a transmitter coupled to the tool body and operable to generate a frequency between 0.5 GHz and 2 GHz and further operable to transmit a substantially radial magnetic dipole moment; and a receiver coupled to the tool body, wherein the receiver is operable to measure a formation dielectric response to the transmitter; and an information handling system, wherein the information handling system is operable to determine properties of a subterranean formation based at least on the measured formation dielectric response.

Statement 13: The system of statement 12, further comprising: a vehicle, a conveyance line, wherein the conveyance line is attached to the vehicle; and wherein the dielectric tool comprises at least one arm coupled to the tool body, wherein the at least one arm extends away from the tool body.

Statement 14: The system of statement 12 or statement 13, further comprising: a platform; a drill string, wherein the dielectric tool comprises stabilizers that extend from the tool body, wherein the transmitter and the receiver is disposed on at least one of the stabilizers and the stabilizers are disposed adjacent a wall of a wellbore; and a drill bit.

Statement 15: A method for determining properties of a subterranean formation comprising: placing a dielectric tool in a wellbore; operating the dielectric tool in the wellbore; measuring a formation dielectric response using the dielectric tool and producing a modeled formation dielectric response; and determining the properties of the subterranean formation from the modeled formation dielectric response.

Statement 16: The method of statement 15, further comprising estimating a standoff effect by using mud resistivity and a caliper log and correcting the measured subterranean formation dielectric response with the estimated standoff effect.

Statement 17: The method of statement 15 or statement 16, further comprising calculating a cost function from the measured formation dielectric response and the modeled formation dielectric response.

Statement 18: The method of statements 15-17, further comprising adjusting the measured formation dielectric response to minimize the cost function and find final formation properties of the subterranean formation.

Statement 19: The method of statements 15-18, further comprising: a vehicle, a conveyance line, wherein the conveyance line is attached to the vehicle; and wherein dielectric tool comprises a transmitter disposed on the dielectric tool, a receiver disposed on the dielectric tool, and at least one arm disposed on the dielectric tool, and wherein the dielectric tool is connected to the conveyance line; and an information handling system operable to at least perform the step of the determining the properties of the subterranean formation from the modeled formation dielectric response.

Statement 20: The method of statements 15-19, further comprising: a platform; a drill string, wherein the dielectric tool is disposed on the drill string and wherein dielectric tool comprises a transmitter disposed on the dielectric tool, a receiver disposed on the dielectric tool, and a stabilizer disposed on the dielectric tool; a drill bit; and an information handling system operable to at least perform the step of determining properties.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A dielectric tool comprising:
   a tool body;
   a transmitter coupled to the tool body and operable to generate a frequency between about 0.5 GHz and about 2 GHz;
   a receiver coupled to the tool body, wherein the receiver is operable to measure formation dielectric response to the transmitter; and
   at least one of the transmitter or at least one of the receiver is operable to have a radial magnetic dipole moment.

2. The dielectric tool of claim 1, wherein the dielectric tool further comprises a pad coupled to the tool body, wherein the at least one of the transmitter and/or the receiver is disposed on pad, wherein the pad is disposed adjacent a wall of a wellbore.

3. The dielectric tool of claim 1, wherein the dielectric tool comprises stabilizers that extend from the tool body, wherein the at least one of the transmitter and the at least one of the receiver is disposed on at least one of the stabilizers and the stabilizers are disposed adjacent a wall of a wellbore.

4. The dielectric tool of claim 1, wherein the dielectric tool is disposed in a wellbore on a conveyance.

5. The dielectric tool of claim 4, wherein the dielectric tool comprises at least one arm coupled to the tool body, wherein the at least one arm extends away from the tool body.

6. The dielectric tool of claim 1, wherein the at least one of the transmitter or at least two receivers is a dielectric resonator antenna.

7. The dielectric tool of claim 1, wherein the at least one of the transmitter or the at least one of the receiver is a substantially radially oriented loop.

8. The dielectric tool of claim 1, wherein the transmitter or the receiver has a magnetic dipole that is between about 0 degrees and about 30 degrees from a radial axis.

9. The dielectric tool of claim 1, wherein the dielectric tool comprises a pad coupled to the tool body and a dielectric material disposed in the pad, and wherein the at least one of the transmitter and the at least one of the receiver comprises a coil that is disposed in the dielectric material.

10. The dielectric tool of claim 1, wherein the dielectric tool comprises a pad coupled to the tool body and a dielectric material disposed in the pad, and wherein the at least one of the transmitter and the at least one of the receiver comprises a conductor in a form of a C-channel disposed in the dielectric material.

11. The dielectric tool of claim 1, wherein the dielectric tool comprises a pad coupled to the tool body and an insulator disposed in the pad, wherein the at least one of the transmitter and the at least one of the receiver comprises a dielectric material disposed in the insulator.

12. A system comprising:
a dielectric tool comprising:
a tool body;
a transmitter coupled to the tool body and operable to generate a frequency between 0.5 GHz and 2 GHz and further operable to transmit a radial magnetic dipole moment; and
a receiver coupled to the tool body, wherein the receiver is operable to measure a formation dielectric response to the transmitter; and
an information handling system, wherein the information handling system is operable to determine properties of a subterranean formation based at least on the measured formation dielectric response.

13. The system of claim 12 further comprising:
a vehicle,
a conveyance line, wherein the conveyance line is attached to the vehicle; and
wherein the dielectric tool comprises at least one arm coupled to the tool body, wherein the at least one arm extends away from the tool body.

14. The system of claim 12 further comprising:
a platform;
a drill string, wherein the dielectric tool comprises stabilizers that extend from the tool body, wherein the transmitter and the receiver is disposed on at least one of the stabilizers and the stabilizers are disposed adjacent a wall of a wellbore; and
a drill bit.

15. A method for determining properties of a subterranean formation comprising:
placing a dielectric tool in a wellbore;
operating the dielectric tool in the wellbore;
measuring a formation dielectric response using the dielectric tool and producing a modeled formation dielectric response; and
determining the properties of the subterranean formation from the modeled formation dielectric response.

16. The method of claim 15 further comprising estimating a standoff effect by using mud resistivity and a caliper log and correcting the measured subterranean formation dielectric response with the estimated standoff effect.

17. The method of claim 15 further comprising calculating a cost function from the measured formation dielectric response and the modeled formation dielectric response.

18. The method of claim 17 further comprising adjusting the measured formation dielectric response to minimize the cost function and find final formation properties of the subterranean formation.

19. The method of claim 15 further comprising:
a vehicle,
a conveyance line, wherein the conveyance line is attached to the vehicle; and
wherein dielectric tool comprises a transmitter disposed on the dielectric tool, a receiver disposed on the dielectric tool, and at least one arm disposed on the dielectric tool, and wherein the dielectric tool is connected to the conveyance line; and
an information handling system operable to at least perform the step of the determining the properties of the subterranean formation from the modeled formation dielectric response.

20. The method of claim 15 further comprising:
a platform;
a drill string, wherein the dielectric tool is disposed on the drill string and wherein dielectric tool comprises a transmitter disposed on the dielectric tool, a receiver disposed on the dielectric tool, and a stabilizer disposed on the dielectric tool;
a drill bit; and an information handling system operable to at least perform the step of determining properties.

* * * * *